Aug. 15, 1967     J. BOULEY     3,336,041
PUSHING AND DRIVING ATTACHMENT FOR TRACTOR
Filed Sept. 23, 1965     3 Sheets-Sheet 1

INVENTOR
Jean BOULEY
BY
Raymond A. Robic
ATTORNEYS

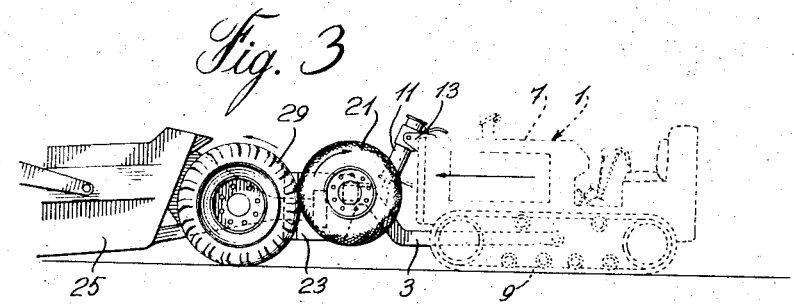
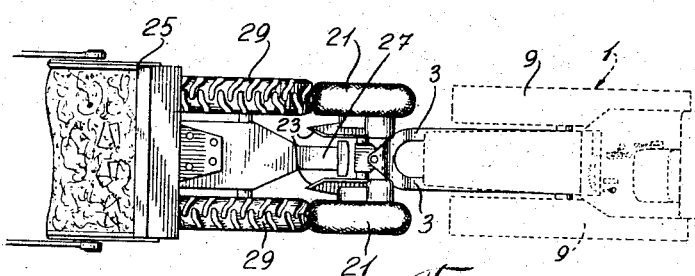
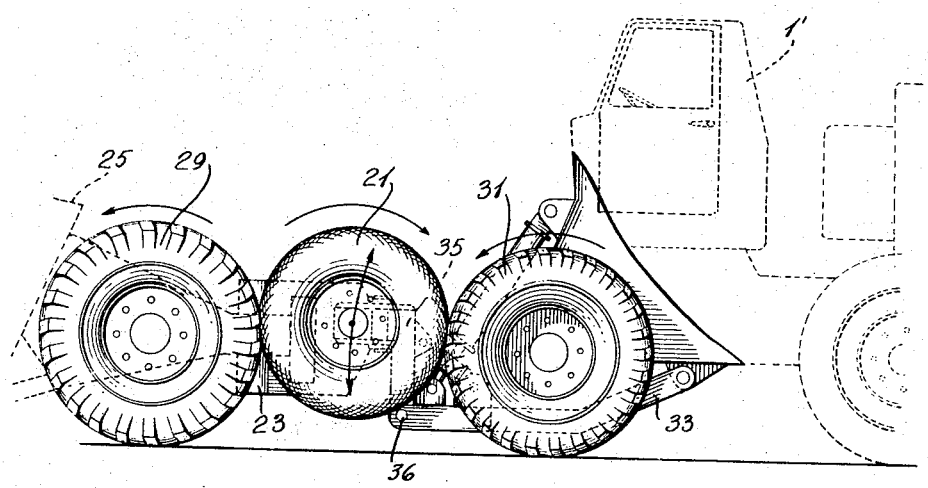

Aug. 15, 1967  J. BOULEY  3,336,041
PUSHING AND DRIVING ATTACHMENT FOR TRACTOR
Filed Sept. 23, 1965  3 Sheets-Sheet 3

INVENTOR
Jean BOULEY
BY
ATTORNEYS

# United States Patent Office 3,336,041
Patented Aug. 15, 1967

3,336,041
PUSHING AND DRIVING ATTACHMENT FOR TRACTOR
Jean Bouley, 2190 Blvd. Portland, Sherbrooke, Quebec, Canada
Filed Sept. 23, 1965, Ser. No. 489,547
1 Claim. (Cl. 280—43.23)

ABSTRACT OF THE DISCLOSURE

An assembly involving a tractor provided with a U-shaped implement support having a front and a rear end with the rear end mounted pivotable about a horizontal axis transverse of the tractor and involving also an earth moving machine having a pair of rear idler wheels and a tail board extending between and past the rear wheels. A horizontal axle having a driving friction wheel at each end thereof is pivotally mounted, centrally thereof, on said support for pivotal movement about a generally upright axis and a pair of spaced parallel horizontal cheeks are provided that project forwardly of the axle to be disposed on either side of the machine tail board to guide the driving wheels and prevent lateral sliding and disengagement of the driving wheels and rear idler wheels.

---

The present invention relates to a pushing and driving attachment for tractor for particular use in providing additional driving power to an earth moving machine such as a tractor scraper or bottom loader adapted for levelling and spreading earth or for scooping and carrying a load of earth from one place to another.

Such a machine is provided with a scooping or scraping device mounted on a wheeled chassis and a motor for displacing the chassis and operating the scooping or scraping device. Experience has shown that if the motor used is strong enough to force the scoop or scraper into compacted earth which often contains roots or rocks or both, the motor will be too strong when used merely for pulling the vehicle regardless of whether the scoop is empty or loaded with earth. In such a case, the motor will be too heavy and wasteful. On the other hand, if the motor is merely strong enough to pull the load around it will not allow scooping or scraping into a pile of earth.

It has therefore been proposed to provide the rear end of the earth moving machine with a projecting tail board and to use a caterpillar as an auxiliary power vehicle to push the machine by applying the blade against the tail board to help the scoop or scraper ram into the pile of compacted earth. This solution has many disadvantages mainly due to the fact that the bulldozer power is only applied as a pushing force and helps little in overcoming the lack of friction beneath the driving wheels of the earth moving machine. In other words, the driving wheels may not be prevented from slipping before the full power of the engine of the earth moving machine is used. In fact, the very shape of the blade of the caterpillar and the manner of applying it will often tend to lift the earth moving machine and thus decrease the friction power beneath the driving wheels.

Other disadvantages of the present day method of pushing the earth moving machine lies in that it is difficult to keep the caterpillar blade properly centered on the tail board. There also exists the danger of damaging the rear pneumatic tires should the blade of the caterpillar slip off the tail board.

I have found that the aforesaid disadvantages may be overcome by providing a special attachment adapted to be mounted on the caterpillar in replacement of the conventional blade, the attachment including friction wheels to be applied against the idler rear wheels of the earth moving machine to thus motorize them while providing additional pushing power. The pushing power would be the same as that when the caterpillar blade is applied against the tail board but the friction drive on the rear idler wheels provide an appreciable additional power capable of substantially improving the working of the scooping or scraping device. Another feature of the attachment of my invention resides in the provision of a pair of spaced parallel guiding cheeks adapted to be disposed on either sides of the aforesaid tail board to ensure proper centering of the attachment and prevent the friction driving wheels from slipping away from the idler rear wheels of the earth moving machine.

A better appreciation of the invention will be afforded by the description that follows having reference to the appended drawings wherein:

FIG. 3 is a side elevation view of the tractor and attachment of FIGURES 1 and 2 as shown applied to the rear end of an earth moving machine;

FIG. 4 is a plane view of the illustration of FIGURE 3;

FIG. 5 is a side elevation view of a second embodiment of the invention as shown mounted on the forward end of a pneumatic tire tractor and applied to the rear end of an earth moving machine;

Figure 1:
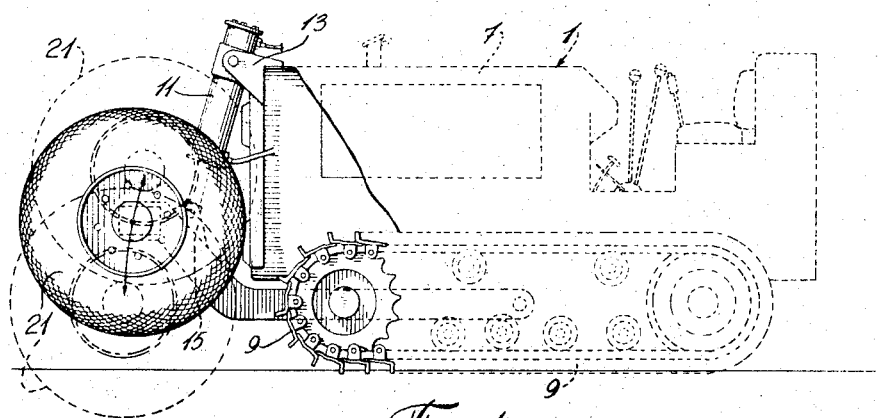
FIG. 1 is a side elevation view of a first embodiment of the attachment of the invention as shown mounted on a caterpillar tractor shown mostly in dotted lines.
Figure 2:
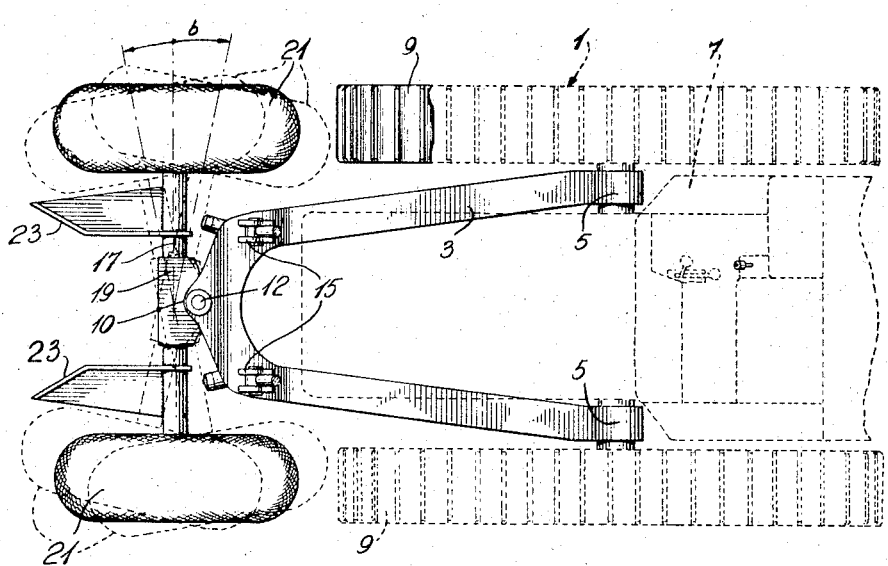
FIG. 2 is a plane view on a somewhat larger scale of the attachment and tractor of FIGURE 1.
Figure 6:
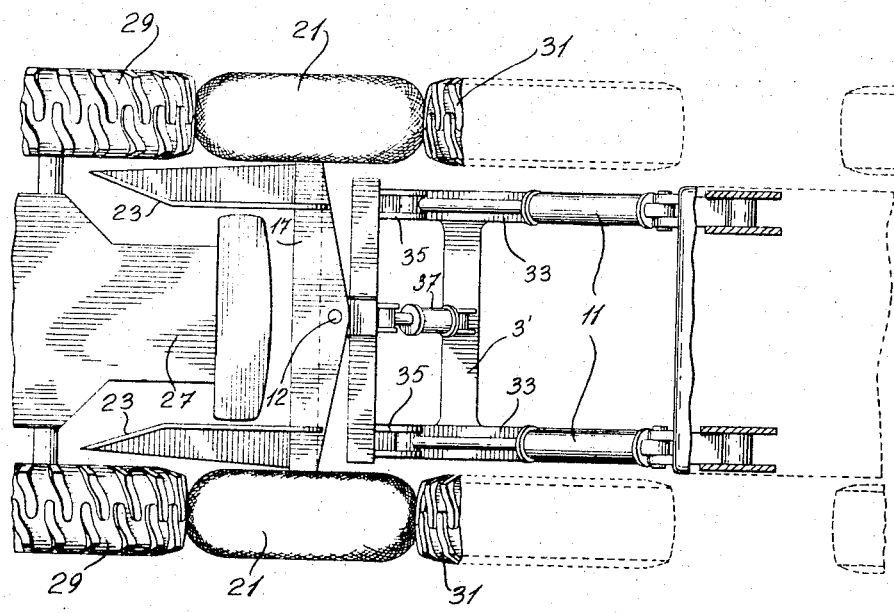
FIG. 6 is a plane view of the embodiment of FIGURE 5.

FIGS. 1 and 2 illustrate one embodiment of the attachment of the invention as shown mounted on a caterpillar tractor 1 shown mostly in dotted lines and of conventional construction. The attachment, as will be seen, can also be of the type usable on a tractor having pneumatic tires as shown in FIGURES 5 and 6 to be referred to again hereinafter.

Caterpillar tractor 1 has the conventional stirrup or U-shaped attachment support 3 the free ends 5 of which are mounted on the body 7 of tractor 1 for pivotal movement about a horizontal axis transverse to the said body 7. The mounting is of conventional nature.

Support 3 projects forwardly of tracks 9 and terminates into a tip 10. As perhaps best illustrated in FIGURE 1, a fluid pressure motor 11, preferably hydraulic, has the cylinder thereof pivotally secured through bracket 13 to the top of tractor 1 while the operating rod is pivotally mounted through a further bracket 15 to the attachment support 3. One such motor is preferably provided on either side of support 3.

The attachment of the invention comprises a horizontal axle 17 extending transversely of tractor 1 and centrally connected by means of a connection 19 to the tip 10 of attachment support 3 in such a manner as to be pivotable through a limited angle b about a generally vertical axis or more precisely an axis normal to the general plane of the lower part of attachment support 3. In view of the limited pivoting angle of the said attachment 3, it may rightly be said that axle 17 is pivotable about a generally vertical axis.

A driving friction wheel 21 preferably provided with a pneumatic tire is mounted at each end of axle 17 to rotate independently thereof.

Finally, a pair of spaced parallel guiding cheeks 23 is provided on axle 17, each being secured thereto by any conventional means such as by welding to project horizontally and forwardly of the tractor 1 and on either side of the pivot connection 12 between the attachment and its support 3 between the two driving wheels 21.

Tractor 1 with the attachment of the invention is shown illustrated in use in FIGURES 3 and 4.

As mentioned previously, the attachment is for use with an earth moving machine 25 provided with a scooping or scraping device (not shown). The machine has a pair of rear idler wheels 29 between which projects a tail board 27 which, as shown, is to engage between the two guiding cheeks 23 when the two driving wheels 21 are applied against the rear idler wheels 29. In this manner, proper alignment of driving wheels 21 is ensured while the danger of disengagement between wheels 21 and 29 is avoided.

With such an arrangement, not only do the driving wheels 21 provide the same pushing power as previously with a blade attachment but rotation power is applied to the idler wheels 29 by friction thus increasing the total available power to displace machine 25. It will also be noted that in the preferred use of the invention the driving wheels 21 are lifted off the ground a distance such that the center thereof (axis of axle 17) is higher than the axis of the rear idler wheels 29 whereby to create a downward component of the driving force tending to further increase the friction between the rear idler tires 29 and the earth. This is precisely the opposite effect as that often provided when a caterpillar blade is applied on the tail board 27, the tendency there being to lift machine 25 rather than press down on it as is the case with the above mentioned downward component.

Power may be applied to driving wheels 21 in any conventional manner such as by providing individual motors built into the hubs of the wheels, as is known.

In the second embodiment shown in FIGURES 5 and 6, the attachment is for use with a tractor 1' having a pair of front pneumatic wheels 31. As shown in FIGURE 5, driving friction wheels 21 of this attachment derive their rotating and driving power by direct contact with the front pneumatic wheels 31 of tractor 1' rather than through separate motor or motors.

In this case, attachment support 3' is formed with a rear part 33 mounted for pivotal movement about the aforesaid horizontal transverse axis and a forward part 35 pivotally connected at the lower end through pivot 36 to the rear part 33 and carrying, at the upper part, the above mentioned assembly of axle 17 and driving friction wheels 21. Two hydraulic motors 11 act as in the first embodiment to adjust the height of axle 17 while a further fluid pressure motor 37, preferably hydraulic, controls pivoting of the front part 35 of attachment support 3' to apply wheels 21 on wheels 31 or free them therefrom.

The remaining construction in regard to the support itself is similar to that described in conjunction with the first embodiment.

With this arrangement, not only can the elevation of the attachment of the invention be controlled but also the frictional engagement and disengagement of the driving wheels 21 against the pneumatic tires 31 of tractor 1'. The operation in itself apart from the driving of the driving wheels 21 is identical to that of the first embodiment.

Figure 7:
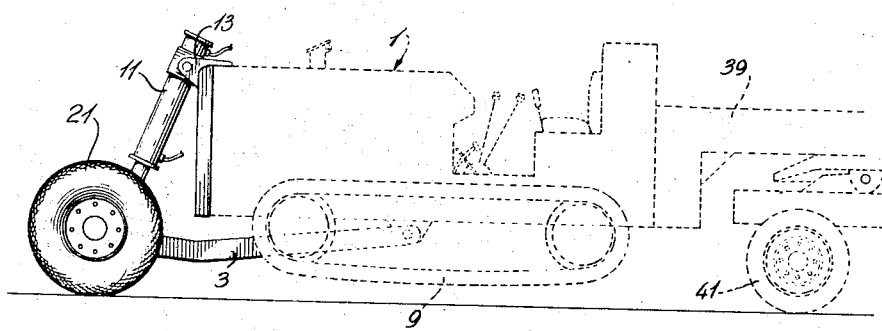
FIG. 7 is a side elevation view, mostly in dotted lines showing a caterpillar tractor provided with an attachment of the invention at the front end and a gooseneck at the rear end mountable on the tractor of a semi-trailer.

FIGURE 7 illustrates an advantage of the attachment of FIGURES 1 to 4. Indeed, if tractor 1 is provided with a suitable gooseneck 39 at the rear end thereof, the latter can be mounted on a semi-trailer tractor 41 and with tractor 1 lifted off the ground by means of the attachment of the invention and as illustrated in FIGURE 7, tractor 1 can easily be carried away without having to be lifted on a wheeled float.

An appreciable advantage to be derived from the attachment just described is that a smooth pneumatic contact between the tractor and the earth moving vehicle is obtained rather than the hard contact which results when the conventional blade of a tractor is used against the tail board of the vehicle.

Although the invention has been illustrated in specific embodiments, it should be understood that various modifications can be brought thereto within the scope of the invention as set forth in the appended claim.

I claim:

In an assembly involving a tractor provided with an implement support having a front and a rear end with the rear end pivotable about a horizontal axis and involving also an earth moving machine having a pair of rear idler wheels and a tail board extending between and beyond said rear wheels, the improvement in the combination therewith comprising;

(a) a horizontal axle having a driving friction wheel at each end thereof applied against said idler wheels to frictionally drive the latter into rotation;

(b) means mounting said axle centrally thereof on said implement support for pivotal movement of said axle and driving wheels about a generally upright axis;

(c) a pair of spaced horizontal cheeks projecting forwardly of said axle and on either side of said machine tailboard to guide said driving wheels whereby to present lateral sliding and disengagement of said driving wheels and rear idler wheels, power means for pivoting said support about said horizontal transverse axis whereby to control elevation of said wheels from the ground;

said tractor has a pair of forward pneumatic wheels and wherein:

said implement support is formed of a rear part connected to said body and a front part pivotally connected to said rear part and carrying said axle and driving wheel;

a motor means is provided between said parts for pivoting of said front part relative to said rear part to cause frictional engagement and disengagement of said driving friction wheels with said forward pneumatic wheels, and said power means is a further motor means interconnecting said rear part and the front end of said tractor to cause pivoting of said implement support about said horizontal transverse axis.

References Cited

UNITED STATES PATENTS

| 2,409,552 | 10/1946 | Donnellan | 180—74 X |
| 2,751,990 | 6/1956 | Finlay et al. | 180—74 X |
| 3,005,510 | 10/1961 | Phillips | 180—74 X |
| 3,156,484 | 11/1964 | Talbert | 280—43.23 X |
| 3,191,963 | 6/1965 | Prichard | 280—43.23 X |
| 3,249,067 | 5/1966 | Keller | 280—43.23 X |
| 3,271,041 | 9/1966 | Acker | 280—43 |

FOREIGN PATENTS

| 1,123,355 | 2/1962 | Germany. |

LEO FRIAGLIA, *Primary Examiner.*

MILTON BUCHLER, *Examiner.*

C. C. PARSONS, *Assistant Examiner.*